UNITED STATES PATENT OFFICE.

JOSEPH SPYER, OF SANTA FÉ, TERRITORY OF NEW MEXICO.

METHOD OF PREPARING RUBBER PLATES FOR THE VULCANIZER.

SPECIFICATION forming part of Letters Patent No. 320,980, dated June 30, 1885.

Application filed May 19, 1885. (No specimens.)

*To all whom it may concern:*

Be it known that I, JOSEPH SPYER, a citizen of the United States, residing at Santa Fé, in the county of Santa Fé and Territory of New Mexico, have invented certain new and useful Improvements in Method of Preparing Rubber Plates for the Vulcanizer; and I do declare the following to be a full, clear, and exact description of the invention, such as will enable others skilled in the art to which it appertains to make and use the same.

This invention relates to improvements in the method of preparing rubber plates for artificial teeth, and vulcanizing the same without flasking.

It consists in the steps hereinafter fully explained, and particularly pointed out in the claim.

In carrying out my invention I use a solution of rubber, which is first perpared by dissolving sheet-rubber in chloroform until it is of the consistency of mucilage, from which solution the cast is coated. The cast is dried by a suitable degree of heat, after which it is coated with thin liquid rubber. Then sheet-rubber is added, the same as done by dentists in what is known as "waxing up a job." After this, plaster mixed with potash alum is poured over the cast, and it is then ready for the vulcanizer.

By the foregoing-described method I dispense with the usual flasking, and the annoyance and unclean work attending the flasking are all avoided, besides saving of time and material.

The surface on the cast which the plate is to cover, is coated with the dissolved rubber. Sheet-rubber is cut the size and form of plates desired, and pressed down evenly and smoothly upon the surface already coated, and the liquid rubber retains it firmly on the cast. The teeth and rubber are then covered with plaster—front, back, and sides—and as many as six or seven cases can be arranged to be vulcanized at one time, and after hardening of the plaster the case is ready to vulcanize.

Fullness is given to a plate from absorption of the jaw by adding small pieces of sheet-rubber with the packing-instrument, by warming both the rubber and the instrument, shaping and fashioning until the proper contour is obtained.

The warming is best done in an alcoholic flame or Bunsen burner, taking care not to burn the rubber when smoothing down any uneven surface of the rubber on the cast.

Having thus described my invention, what I claim, and desire to secure by Letters Patent, is—

The hereinbefore-described method of preparing dental casts for the vulcanizer, consisting of forming the plate with rubber, drying it, then coating it with thin liquid rubber, then adding sheet-rubber, then covering it with plaster mixed with potash alum and vulcanizing without flasks, substantially as set forth.

In testimony whereof I affix my signature in presence of two witnesses.

JOSEPH SPYER.

Witnesses:
   R. WILLIAMS.
   EDWIN B. SEWARD.